US012159282B2

(12) United States Patent
Dunjic et al.

(10) Patent No.: US 12,159,282 B2
(45) Date of Patent: *Dec. 3, 2024

(54) SMART CHIP CARD WITH FRAUD ALERT AND BIOMETRIC RESET

(71) Applicant: The Toronto-Dominion Bank, Toronto (CA)

(72) Inventors: Milos Dunjic, Oakville (CA); Perry Aaron Jones Haldenby, Toronto (CA); Arthur Carroll Chow, Markham (CA); Het Anand Patel, Mississauga (CA); Casey Lyn Doyle, Ajax (CA); Yubing Liu, Toronto (CA); Anthony Haituyen Nguyen, Toronto (CA); David Samuel Tax, Toronto (CA); Arun Victor Jagga, Toronto (CA); John Jong-Suk Lee, Toronto (CA)

(73) Assignee: The Toronto-Dominion Bank

( * ) Notice: Subject to any disclaimer, the term of this patent is extended or adjusted under 35 U.S.C. 154(b) by 110 days.

This patent is subject to a terminal disclaimer.

(21) Appl. No.: 17/489,222

(22) Filed: Sep. 29, 2021

(65) Prior Publication Data
US 2022/0020030 A1 Jan. 20, 2022

Related U.S. Application Data

(63) Continuation of application No. 15/650,180, filed on Jul. 14, 2017, now Pat. No. 11,157,908.

(51) Int. Cl.
*G06Q 20/40* (2012.01)
*G06K 7/00* (2006.01)
(Continued)

(52) U.S. Cl.
CPC ..... *G06Q 20/40145* (2013.01); *G06K 7/0021* (2013.01); *G06K 19/07354* (2013.01);
(Continued)

(58) Field of Classification Search
CPC ........... G06Q 20/40145; G06Q 20/341; G06Q 20/34; G06Q 20/354; G06Q 20/36; G06Q 20/3574
See application file for complete search history.

(56) References Cited

U.S. PATENT DOCUMENTS 6,188,309 B1 2/2001 Levine
7,039,221 B1 5/2006 Tumey et al.
(Continued)

FOREIGN PATENT DOCUMENTS

KR 20170001680 1/2017
WO WO2006092393 9/2006
(Continued)

OTHER PUBLICATIONS

Credit.com [online], "Credit Cards and "Temporary" Account Numbers", Apr. 2017, [retrieved on Apr. 16, 2021], retrieved from: URL <https://www.credit.com/blog/credit-cards-and-temporary-account-numbers-what-you-need-to-know-7813/>, 4 pages.
(Continued)

*Primary Examiner* — Hao Fu
(74) *Attorney, Agent, or Firm* — Fish & Richardson P.C.

(57) ABSTRACT

The disclosure generally describes computer-implemented methods, software, and systems, including a method for placing a card into an alert state. An alert detection indication is received during an attempted data exchange using a permanent account number (PAN) associated with a card. The alert detection indication is received by an electronic controller embedded in the card and is received through an interface. The alert detection indication indicates that the PAN has an alert state identified for the PAN by an entity that issued the card. An operational mode of the card is modified into the alert state by the electronic controller and is based on receipt of the alert detection indication. An electronic
(Continued)

display indicating that the card is in the alert state is displayed by the electronic controller.

27 Claims, 10 Drawing Sheets

(51) Int. Cl.
*G06K 19/073* (2006.01)
*G06Q 20/34* (2012.01)
*G06Q 20/36* (2012.01)
*G06Q 30/018* (2023.01)
*G06Q 40/02* (2023.01)

(52) U.S. Cl.
CPC ......... *G06Q 20/341* (2013.01); *G06Q 20/354* (2013.01); *G06Q 20/3672* (2013.01); *G06Q 20/40* (2013.01); *G06Q 20/4016* (2013.01); *G06Q 20/403* (2013.01); *G06Q 30/0185* (2013.01); *G06Q 40/02* (2013.01)

(56) References Cited

U.S. PATENT DOCUMENTS

| | | | |
|---|---|---|---|
| 7,543,156 | B2 | 6/2009 | Campisi |
| 7,556,193 | B1 | 7/2009 | Amsterdam et al. |
| 8,201,747 | B2 | 6/2012 | Brown et al. |
| 8,256,667 | B2 | 9/2012 | Poznansky et al. |
| 8,360,322 | B2 | 1/2013 | Bonalle et al. |
| 8,581,692 | B2 | 11/2013 | Sikkerveer et al. |
| 8,814,052 | B2 | 8/2014 | Bona et al. |
| 9,183,553 | B2 | 11/2015 | Wang |
| 9,218,557 | B2 | 12/2015 | Spodak et al. |
| 9,361,441 | B2 | 6/2016 | Partouche et al. |
| 9,477,852 | B1 * | 10/2016 | Neale ................. G06K 19/0723 |
| 11,062,312 | B2 | 7/2021 | Dunjic et al. |
| 2004/0124246 | A1 | 7/2004 | Allen et al. |
| 2007/0073619 | A1 | 3/2007 | Smith |
| 2007/0189581 | A1 | 8/2007 | Nordentoft et al. |
| 2008/0126260 | A1 | 3/2008 | Cox et al. |
| 2008/0201265 | A1 | 8/2008 | Hewton |
| 2010/0250812 | A1 | 9/2010 | Webb et al. |
| 2012/0153028 | A1 | 6/2012 | Poznansky et al. |
| 2013/0185167 | A1 | 7/2013 | Mestre et al. |
| 2014/0122340 | A1 | 5/2014 | Flitcroft et al. |
| 2014/0138449 | A1 * | 5/2014 | Goldman ......... G06K 19/06206 235/492 |
| 2014/0279476 | A1 | 9/2014 | Hua |
| 2014/0339315 | A1 | 11/2014 | Ko |
| 2015/0227923 | A1 | 8/2015 | Kutsch et al. |
| 2016/0098705 | A1 | 4/2016 | Kurapati |
| 2016/0148194 | A1 | 5/2016 | Guillaud et al. |
| 2016/0307190 | A1 | 10/2016 | Zarakas et al. |
| 2016/0308371 | A1 * | 10/2016 | Locke .............. G06K 19/07707 |
| 2018/0005241 | A1 | 1/2018 | Smothers et al. |
| 2018/0101718 | A1 * | 4/2018 | Lowe .................... G06F 18/251 |
| 2019/0019075 | A1 | 1/2019 | Dunjic et al. |
| 2019/0019195 | A1 | 1/2019 | Dunjic et al. |

FOREIGN PATENT DOCUMENTS

| | | |
|---|---|---|
| WO | WO2009001394 | 12/2008 |
| WO | WO2009064138 | 5/2009 |
| WO | WO2009064139 | 5/2009 |
| WO | WO2011090230 | 7/2011 |
| WO | WO2016055665 | 4/2016 |
| WO | WO2017025479 | 2/2017 |

OTHER PUBLICATIONS

GlobalPlatform.org [online], "Card Specification—ISO Framework" Mar. 2014 [retrieved on Oct. 28, 2020], retrieved from : URL <https://globalplatform.org/wp-content/uploads/2014/03/GPC_ISO_Frannework_v1.0.pdf>, 100 pages.

Office Action in Canada Appln. No. 2,973,711, dated Dec. 1, 2022, 7 pages.

* cited by examiner

440

```
┌─────────────────────────────────────────────────────────────────────┐
│ Receive, from a POS being used by a user, information that a new PAN has │
│ been activated for a card issued to the user by the entity, the new PAN usable │
│ in further data exchanges of the card, wherein the information includes the new │
│ PAN and information identifying the card                            │
│                                                                 442 │
└─────────────────────────────────────────────────────────────────────┘
                                  │
                                  ▼
┌─────────────────────────────────────────────────────────────────────┐
│ Determine that the new PAN is valid                                 │
│                                                                 444 │
└─────────────────────────────────────────────────────────────────────┘
                                  │
                                  ▼
┌─────────────────────────────────────────────────────────────────────┐
│ Store the information at a server of the entity                     │
│                                                                 446 │
└─────────────────────────────────────────────────────────────────────┘
```

FIG. 4C

SMART CHIP CARD WITH FRAUD ALERT AND BIOMETRIC RESET

CROSS-REFERENCE TO RELATED PATENT APPLICATIONS

This application is a continuation of and claims the benefit of priority to U.S. patent application Ser. No. 15/650,180, filed Jul. 14, 2017, the contents of which are incorporated by reference herein.

BACKGROUND

The present disclosure relates to fraud protection for consumer cards such as credit cards.

Cards, such as credit cards and debit cards, can be used by cardholders during electronic transactions. Fraud can sometimes be detected for accounts that are associated with the cards.

SUMMARY

The disclosure generally describes computer-implemented methods, software, and systems for locking and unlocking a card.

For example, a system for locking a card, such as an electronic card, can include an electronic controller embedded in the card and operable to: receive, via an interface when the card is in a useable state, an alert detection indication during an attempted data exchange using a primary (or permanent) account number (PAN) associated with the card, wherein the alert detection indication includes an indication that an alert state is currently associated with the PAN by an entity associated with issuance of the card; and modify, based on the received alert detection indication, an operational mode of the card from the useable state to the alert state. The system can also include an electronic display coupled to the electronic controller and embedded in the card and operable to: receive, from the electronic controller, information that the card is in the alert state; and provide a visual indication that the card is in the alert state. The system can also include memory storing one or more PANs assigned to the card. The system can also include one or more processors performing operations, using the memory, the operations including operations of the electronic controller and the electronic display.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the system further includes a chip embedded in the card and operable to be read by chip readers.

In a second aspect, combinable with any of the previous aspects, the alert detection indication originates at the entity and includes a fraud detection indication indicating that fraudulent activity of the card is suspected or has been detected.

In a third aspect, combinable with any of the previous aspects, the attempted data exchange includes a monetary transaction.

In a fourth aspect, combinable with any of the previous aspects, the interface includes a power modulation or a receiving module of the card.

In a fifth aspect, combinable with any of the previous aspects, the attempted data exchange includes an attempted use of the card at a point-of-sale (POS) terminal.

In a sixth aspect, combinable with any of the previous aspects, the attempted use includes a near-field communication (NFC) communication between the card and the POS terminal.

In a seventh aspect, combinable with any of the previous aspects, the attempted use includes a communication between the card and a controller of the POS terminal.

In an eighth aspect, combinable with any of the previous aspects, the controller of the POS reader is a card reader of the POS terminal.

In a ninth aspect, combinable with any of the previous aspects, modifying the operational mode of the card to the alert state includes making the card unusable for further data exchanges using the card.

In a tenth aspect, combinable with any of the previous aspects, the attempted data exchange is associated with a particular PAN, and wherein the alert state causes the particular PAN to be invalid for further data exchanges.

In an eleventh aspect, combinable with any of the previous aspects, the electronic display is a light-emitting diode (LED), and wherein the LED displays a fraud indication color for the alert state of the card that is different from a color displayed for a usable state of the card.

In a twelfth aspect, combinable with any of the previous aspects, the card includes a credit card, a debit card, a value-added card, a point-of-entry card, or an identification card.

In a thirteenth aspect, combinable with any of the previous aspects, the attempted data exchange is associated with a particular PAN, and wherein the alert state causes the particular PAN to be invalid for further data exchanges.

In a fourteenth aspect, combinable with any of the previous aspects, electronic display includes a light-emitting diode (LED), and wherein the LED displays a fraud indication color for the alert state of the card that is different from a color displayed for a usable state of the card For example, a system for unlocking a card, such as an electronic card, can include a biometric sensor operable to read a biometric input of a cardholder of the card, the biometric input associated with an attempted authentication, by the cardholder, as an authorized user of the card, wherein one or more authorized users are defined by an entity associated with the card. The system can also include an electronic controller embedded in the card and coupled to the biometric sensor, the electronic controller operable to: receive, from the biometric sensor and via an electronic controller embedded in the card at a time when the card has an operational mode of an unusable state, the received biometric input of the cardholder, the unusable state of the card being previously identified by the entity for a particular permanent account number (PAN), the particular PAN invalidated for use in further data exchanges using the card; determine that the received biometric input matches a pre-loaded biometric profile stored on the card, the pre-loaded biometric profile associated with the authorized user of the card; activate, based on the biometric input match, a new PAN for the card, the new PAN usable in further data exchanges of the card; and modify, by the electronic controller, the operational mode of the card to a usable state. The system can also include a first electronic display embedded in the card and coupled to the electronic controller, the first electronic display operable to: receive, from the electronic controller, information that the card is in the usable state and provide a visual indication that the card is in the usable state. The system can also include memory storing: one or more PANs assigned to the card; and one or more biometric profiles of users authorized to use the card. The system can also include one or more processors performing operations, using the memory, the operations including operations of the electronic controller and the electronic display.

The foregoing and other implementations can each optionally include one or more of the following features, alone or in combination. In particular, one implementation can include all the following features:

In a first aspect, combinable with any of the previous aspects, the system further includes a chip embedded in the card and operable to be read by chip readers.

In a first aspect, combinable with any of the previous aspects, the biometric input consists of at least one of a finger print, a palm print, a voice print, an image of a face, an iris scan, a retinal scan, and a body scent.

In a second aspect, combinable with any of the previous aspects, the system further includes a second electronic display operable to present the new PAN.

In a third aspect, combinable with any of the previous aspects, the second electronic display and the first electronic display comprise a single display.

In a fourth aspect, combinable with any of the previous aspects, the second electronic display is separate from the first electronic display.

In a fifth aspect, combinable with any of the previous aspects, the second electronic display is a liquid crystal display (LCD) display area, and wherein the first electronic display is a light emitting diode (LED) indicator.

In a sixth aspect, combinable with any of the previous aspects, the new PAN activated for the card is one of the one or more PANs stored to the card.

In a seventh aspect, combinable with any of the previous aspects, the activated new PAN is one of: a next PAN in a set of pre-loaded PANs on the card; or a randomly-assigned PAN assigned from the set of pre-loaded PANs, wherein the pre-loaded PANs on the card correspond to a set of valid PANs stored at the entity.

In an eighth aspect, combinable with any of the previous aspects, the system further includes a chip embedded in the card and operable to be read by chip readers, the chip coupled with the biometric sensor, the electronic controller, and the first electronic display.

In a ninth aspect, combinable with any of the previous aspects, the further data exchanges include monetary transactions.

In a tenth aspect, combinable with any of the previous aspects, the first electronic display includes a light-emitting diode (LED), and wherein the LED displays a fraud indication color for the alert state of the card that is different from a color displayed for a usable state of the card.

In an eleventh aspect, combinable with any of the previous aspects, the card consists of at least one of a credit card, a debit card, a value-added card, a point-of-entry card, and an identification card.

The subject matter described in this specification can be implemented in particular implementations so as to realize one or more of the following advantages. First, a fraud alert indication can be provided on a card, such as using an ultra-low power light-emitting diode (LED). Second, the card can provide a real-time fraud detection mechanism at a point of sale (POS) terminal, including switching the card into an OFF mode (or a blocked or unusable state) once the fraud alert is triggered. Third, a consumer can have an option to reset the card, including turning the fraud alert OFF, e.g., using a built-in fingerprint sensor, which can also return the card back to ON mode (unblocked and usable). Fourth, the fraud alert reset initiated by the cardholder can result in the assignment of a new PAN being generated for the card in sync with a card-issuing host, such as a bank or financial institution. Fifth, the ability to reset the card can eliminate the need for card reissuance, if the card (or associated account number) has been compromised.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 4C is a flowchart of an example method for placing a card into a usable state, from the perspective of an entity.

Like reference numbers and designations in the various drawings indicate like elements.

DETAILED DESCRIPTION

This disclosure generally describes computer-implemented methods, software, and systems for using a smart chip card with a fraud alert and a biometric reset. For example, when a card, such as a credit card, is determined to be in a fraud state, an authorization response can set a fraud alert flag status, such as inside a Europay, MasterCard, Visa (EMV) issuer authentication data (ISO) 8583 data element that can be digitally signed with an issuer host private key. When fraud is detected, for example, the fraud alert flag status can be set to ON. Otherwise, during times of normal authorized use of the card, the fraud alert flag status can be set to OFF. The EMV issuer authentication data can eventually be delivered to the card. Delivery can occur, for example, when a cardholder is asked to insert the card into a POS terminal, which can happen after a counter for a maximum number of consecutive contactless transactions is exceeded. The card can analyze the delivered response, and if the fraud alert flag status is ON, then the card can switch an LED on the card to red (e.g., versus normal usage when the LED is GREEN), blocking the card for further transactions and invalidating a current PAN in the card. Other sequences for blocking a card are possible. In some implementations, updates to the card can occur wirelessly, such as through near-field communication, Bluetooth, or another communication protocol.

Once the card is blocked and its PAN is invalidated, the cardholder must pass at least one biometric validation (e.g., a fingerprint validation or a thumb print validation) using the card to unblock the card and enable the card for further use. This action can also set the new PAN in the card, either by choosing from a pre-loaded array of PANs (e.g., pre-loaded during personalization) or by dynamically generating a new PAN through a process that uses an end-to-end format preserving PAN encryption method. Such a process can combine, for example, a current EMV application transaction counter (ATC), a previous PAN, and a three data encryption standard (3DES) key shared with the issuer host. In some instances, the new PAN can be displayed, such as on a liquid crystal display (LCD) screen. In other instances, PANs may be hidden from the cardholder and may not be displayed on the card, or may be displayed in a separate display at a location remote from the card (e.g., a mobile device, a POS location, etc.). Other sequences for unblocking a card are possible, such as through an audible verification or other biometric verifications. In some implementations, the PAN is not displayed on the card, but can be displayed apart from the card in different instances.

Figure 1:
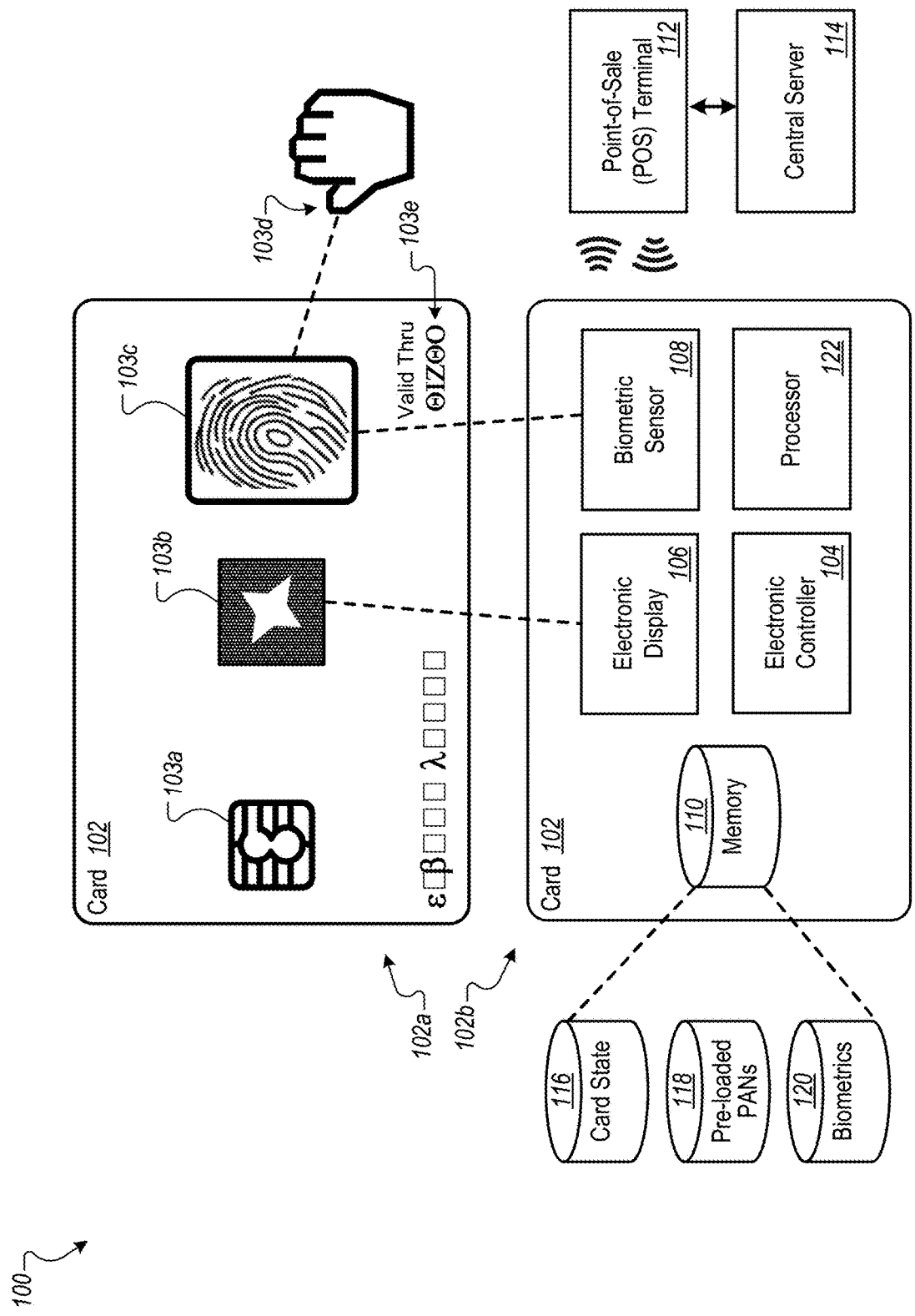
FIG. 1 is a block diagram of a card system for setting usability states on a card.

FIG. 1 is a block diagram of a card system 100 for setting usability states on a card 102. For example, the card 102 can be an electronic card, such as a card having embedded electronics, including one or more processors and memory storing instructions that can be executed by the one or more processors. When the card 102 is in a useable state, the card system 100 can be used to put the card 102 into an alert state (e.g., an unusable state). In another example, when the card 102 is in an unusable state (e.g., an alert state or a fraud state), the card system 100 can be used to put the card 102 into a useable state. The attempted data exchange can be associated with a particular PAN, and the alert state can cause the particular PAN to be invalid for further data exchanges.

The card 102 can be any type of card for which transactions can occur, including a credit card, a debit card, a value-added card, a point-of-entry card, an identification card, a loyalty card, a gift card, or some other consumer card, an ID verification card. In some implementations, the card system 100 can be used for electronic objects that are not cards, such as point-of-entry scanners, security systems, medical facilities, government facilities, public facilities, equipment and hardware.

A physical view 102a of the card 102 shows that the card 102 can include a visible display element 103b of an electronic display 106 and a visible sensor surface 103c of a biometric sensor 108. The biometric sensor 108 can be operable to read a biometric input of a cardholder of the card. As described below with reference to FIG. 2B, the biometric input can be an attempted authentication, by the cardholder, as an authorized user of the card. For example, one or more authorized users can be defined by an entity (e.g., a bank or other financial institution) associated with the card 102, such as the central server 114. In some implementations, the biometric sensor 108 can be capable of scanning a thumb print 103d, such as the thumb print of the user to whom the card 102 is issued. Other types of biometric inputs can be read by or used for the biometric sensor 108, such as one or more of a finger print, a palm print, a voice print, an image of a face, an iris scan, a retinal scan, or a body scent.

The card 102 can also include a chip 103a that is embedded in the card and is operable to be read by chip readers such as point-of-sale (POS) terminals, card readers, or other equipment. The card 102 can also include visible account information 103e, such as including account numbers, expiration dates, cardholder names, cardholder images, and other visible information.

A functional view 102b of the card 102 shows an electronic controller 104 that is embedded in the card 102 and coupled with the electronic display 106. The electronic controller 104 can receive an alert detection indication during an attempted data exchange using a PAN associated with the card. The attempted data exchange can be, for example, a monetary transaction, such as a purchase transaction using the card 102 that occurs when making a purchase at a brick-and-mortar location. For example, the attempted data exchange can be an attempted use of the card 102 at a POS terminal 112. The attempted data exchange of the card 102 can include, for example, a near-field communication (NFC) communication between the card 102 and the POS terminal 112. In another example, the attempted data exchange of the card 102 can include a communication between the card and a controller of the POS terminal 112. In some implementations, the controller can be a card reader of the POS terminal 112. The attempted data exchange can occur, for example, when the card 102 is in (or is thought to be in) a useable state, such as after one or more recent successful transactions (in which the transactions and the card were not denied). The alert detection indication can be, for example, an indication that an alert state is currently associated with the PAN by an entity associated with issuance of the card. The entity may be, for example, a central server 114, such as a bank or other financial institution that issued the card to the user. The alert detection indication can originate, for example, at the entity. The alert detection indication can serve as a fraud detection indication, e.g., indicating that fraudulent activity of the card is suspected or has been detected. In some implementations, an interface in the card 102 can receive the alert detection indication. In some implementations, the interface can include a power modulation or a receiving module of the card 102.

In some non-limiting embodiments in which the card employs a passive capacitive biometric sensor, the sensor may be powered passively from an external source. In other embodiments where the card employs an actively-powered sensor, the sensor and associated hardware may be powered through the power modulation of the card. When the alert detection indication is received, the electronic controller 104 can modify an operational mode of the card, for example, by changing the state of the card 102 from a useable state to the alert state. In some implementations, modifying the operational mode of the card to the alert state can include making the card 102 unusable for further data exchanges (e.g., monetary transactions) using the card 102.

The electronic controller 104 can also perform operations associated with unlocking a card. For example, at a time that the card 102 has an operational mode of an unusable state, the electronic controller 104 can receive, from the biometric sensor 108, a biometric input (e.g., thumb print) of the cardholder. The unusable state of the card 102 can have been previously identified by an entity (e.g., bank or financial institution) for a particular permanent account number (PAN), thus invalidating the particular PAN for use in further data exchanges using the card 102. Upon receipt of the biometric input, for example, the electronic controller 104 can determine that the received biometric input matches a pre-loaded biometric value or profile stored on the card (e.g., in biometric values or profiles 120) and that is associated with an authorized user of the card. Biometric inputs can include one or more of a finger print, a palm print, a voice print, an image of a face, an iris scan, a retinal scan, or a body scent. Based on the determination that the received biometric input matches a stored biometric value of an authorized user, the electronic controller 104 can activate a new PAN for the card, the new PAN being usable in further data exchanges of the card 102. In some implementations, a biometric input may be shared and/or sent to backend for verification, such as if the biometric value or profile is not stored directly on card. The new PAN activated for the card 102 can be one of the one or more PANs stored to the card 102, such as in the pre-loaded PANs 118. The activated new PAN can be, for example, a next PAN in the set of pre-loaded PANs stored on the card, or a randomly-assigned PAN assigned from the set of pre-loaded PANs. The pre-loaded PANs on the card 102 can correspond, for example, to a set of valid PANs stored at the entity (e.g., the central server 114). The electronic controller 104 can also modify the operational mode of the card to a usable state and provide information (e.g., a command) to the electronic display 106 that the card is now usable again.

An electronic display 106 can update the visible display element 103b based on information that is to be displayed to the cardholder. For example, actions taken by the electronic display 106 can be based on received inputs from one or more components of the card, such as information that is received from the electronic controller 104 that the card is in the alert state. In some implementations, the electronic controller 104 can provide an alert message, from which the electronic display 106 is programmed (e.g., based on application logic or table look-up) to change or set the visible display element 103b to a pre-determined color (e.g., red to replace a color, e.g., green, indicating non-fraud, usable state of the card 102, or activate an image or visual indication when in a non-usable state). Other actions are possible, such as providing visual (and/or audible) alert, including a description of the reason for the alert (e.g., fraud has been detected, an account has been denied, or other information). Other indications not using the card are also possible, including indications provided to another location, such as at a phone (or other mobile device) or at the POS. Such other locations can send and receive signals with the card, either in parallel or instead of the indication on the card. When the electronic display 106 receives information from the electronic controller 104 that the card is in the alert state, the visible display element 103b can display a red indicator, for example. Other colors and/or displays can be used, for example, to indicate other information, such as a yellow color being presented if the cardholder should contact an entity (e.g., the card-issuing bank) for some reason. Alternatively, an indication may only be shown on the visible display element 103b or elsewhere on or related to the card 102 when the alert is triggered or active.

At a different time, the electronic display 106 can receive information from the electronic controller 104 that the card is now in a usable state, such as after the cardholder has provided a biometric input to re-authenticate the card 102. The electronic display 106 can receive, such as from the electronic controller 104, information that the card 102 is in the usable state. Based on the received information, the electronic display 106 can provide a visual indication (e.g., green light or indicator) that is viewable by the cardholder and that indicates that the card 102 is in a usable state. As a result, the card 102 is then capable of being used in further data exchanges, e.g., monetary transactions.

In some implementations, a usable state of the card 102 (and/or a display of a usable color on the visible display element 103b) can indicate that the card 102 has been activated for a first time. For example, activation can be initiated by the user by calling an 800 number or activating the card online to register receipt of the card 102 when received (e.g., by mail).

In some implementations, the electronic display 106 can be a light-emitting diode (LED). For example, the LED can display a fraud indication color (e.g., red) for the alert state of the card that is different from a color (e.g., green) displayed for a usable state of the card. In some implementations, the LED can be an ultra-low power LED. Other types of display lighting and presentation can be used. Moreover, in addition to the display, other features, including audible features, can be used. In some implementations, the electronic display 106 can be a liquid crystal display (LCD) or some other type of display.

In some implementations, a second electronic display can exist on the card 102. For example, the second electronic display can be operable to present a new PAN to which the card 102 is associated upon successful unlocking of the card 102. In some implementations, the second electronic display can be the same as a first electronic display (e.g., the electronic display 106), or the second electronic display can be different from the first electronic display. In some implementations, the second electronic display can be a LCD display area, and the first electronic display can a light emitting diode (LED) indicator. In some implementations, the second electronic display and the first electronic display can be combined, e.g., capable of displaying a color (e.g., red or green, depending on a current state of the card 102), and text (e.g., to present the new PAN and/or other textual information).

Memory 110 on the card 102 can include storage of a card state 116, e.g., indicating that the card 102 is in an operational state of usable, unusable, and possibly other states, such as a pending state if the card 102 is waiting to receive information that would make the card 102 usable again (if recently in an unusable state). Memory 110 on the card 102 can include storage of pre-loaded PANs 118, e.g., that include one or more PANs that are assigned to the card 102 (and available for activation, if ever needed). Memory 110 can also store the biometric values or profiles 120 that include one or more biometric values associated with and uniquely identifying users who are authorized to use the card. Memory 110 may include any type of memory or database module, as described in detail below.

One or more processors 122 embedded in the card 102 can perform operations, including operations of the electronic controller 104, the electronic display 106, the biometric sensor 108, and any other components of the card not depicted in FIG. 1.

In some implementations, the use of biometric inputs can be required for one or more transactions, such as transactions occurring for particular POS terminals and/or transactions having transaction amounts over a threshold monetary amounts (or in other cases). In some implementations, the use of biometric inputs and validations can be included to reset a card without requiring the use of a new PAN, such as if fraud was suspected but the user/cardholder has indicated that the potentially fraudulent transactions are legitimate. In such cases, the use of biometric inputs may be required to authenticate the user.

Figure 2A:
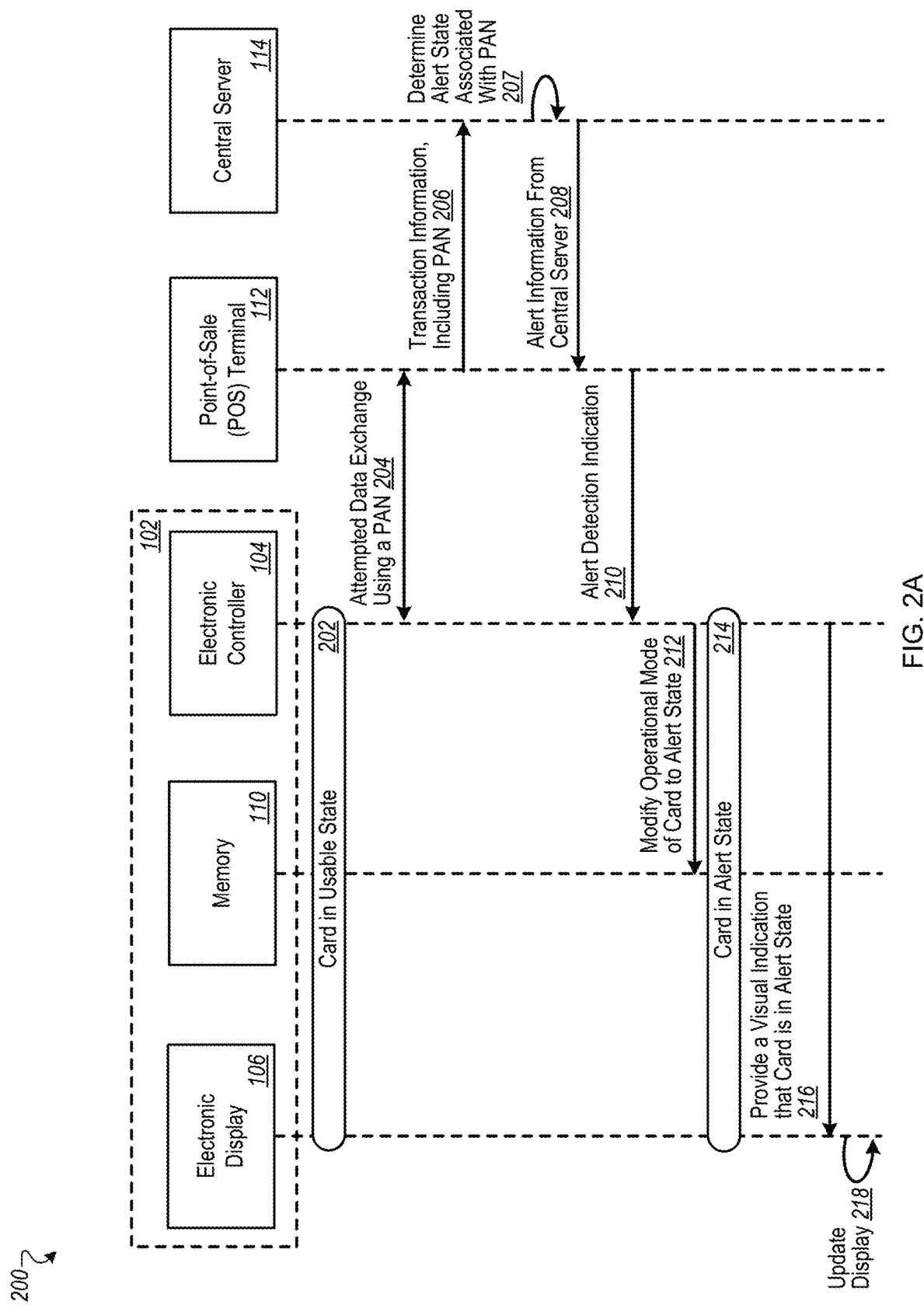
FIG. 2A is a swim lane diagram showing an example method for locking a card.

FIG. 2A is a swim lane diagram showing an example method 200 for locking a card. For clarity of presentation, the description that follows generally describes method 200 in the context of FIG. 1. However, it will be understood that the method 200 may be performed, for example, by any other suitable system, environment, software, and hardware, or a combination of systems, environments, software, and hardware as appropriate. For example, the card 102 and/or its components, particularly the electronic controller 104, can be used to execute the method 200.

At a time that the method 200 is applicable, the card 102 can be in a usable state 202. For example, the time can be a time at which the card is in (or is thought to be in) a useable state, such as after one or more recent successful transactions using the card 102. The time is also a time just prior to an attempted data exchange, such as when the cardholder is about to make a purchase using the card 102 at a POS terminal 112. The visible display element 103b may be displaying a color (e.g., green, or some other visible indicator) at this time, indicating that the card 102 is (or thought to be) usable.

At 204, an attempted data exchange (e.g., a monetary transaction) can occur that uses a particular permanent account number (PAN) associated with the card 102. For example, the attempted data exchange can occur when the cardholder uses the card 102 at the POS terminal 112, such as by inserting the card 102 into a chip reader, or swiping the card 102, or via a wireless communication interaction (e.g., NFC-based communications). At that time, the PAN associated with the card can be the currently activated one of multiple PANs that were pre-loaded on the card 102 by an entity (e.g., the central server 114, such as a bank, a third-party card preparer, etc.). Other attempted data exchanges are possible, including online uses of the card 102, such as on shopping web sites and payment screens.

At 206, the POS terminal 112 can provide transaction information associated with the attempted data exchange to the central server 114. The transaction information can include, for example, the PAN used in the attempted data exchange and a transaction amount.

At 207, an alert state associated with the PAN is determined. For example, the central server 114 can use the received PAN and as part of a verification process of a transaction being executed, which can result in determining that the PAN has been compromised, such as based on detected or reported fraudulent activity or for some other reason.

At 208, the central server 114 can provide an alert that can be received at the POS terminal 112. The alert can be generated by the central server 114, for example, if fraud has been detected in association with the PAN, or if a credit limit or balance have been identified using the provided transaction amount. Other types of reasons for an alert can be used.

At 210, an alert detection indication can be received by the electronic controller 104, such as through an interface in the card 102. In some implementations, the interface can include a power modulation or a receiving module of the card. The alert detection indication can be an indication that the PAN has an alert state identified for the PAN by the central server 114 (or some other entity that issued the card). The alert detection indication can apply to a current PAN activated on the card 102, or the alert detection indication can apply to some other account identifier or account number, such as that may apply to different types of cards 102. The fraud detection indication can indicate, for example, that fraudulent activity of the card 102 (or more generally, the PAN assigned to the card) is suspected or has been detected.

At 212, the electronic controller 104 can modify an operational mode of the card 102 into the alert state. The electronic controller 104 can make the modification based on receipt of the alert detection indication from the POS terminal 112, for example. Modifying the operational mode of the card 102 to the alert state can include making the card unusable for further data exchanges using the card 102.

At 214, the card 102 is in an alert state, meaning that the card 102 is not usable for transactions, including, for example, causing the particular PAN to be invalid for further data exchanges. In some implementations, the alert state can be represented in the card 102 by storage of the current card state 116.

At 216, the electronic display 106 can provide a visual indication that the card 102 is in the alert state. In some implementations, the electronic controller 104 can provide a command or some other information that the electronic display 106 can use to update the visible display element 103b at that time, such as changing the color or the visible display element 103b to red or providing some other display indicating that the card 102 is unusable.

At 218, the electronic display 106 can update the visible display element 103b, such as by turning the color of the display to red (e.g., replacing green).

Figure 2B:
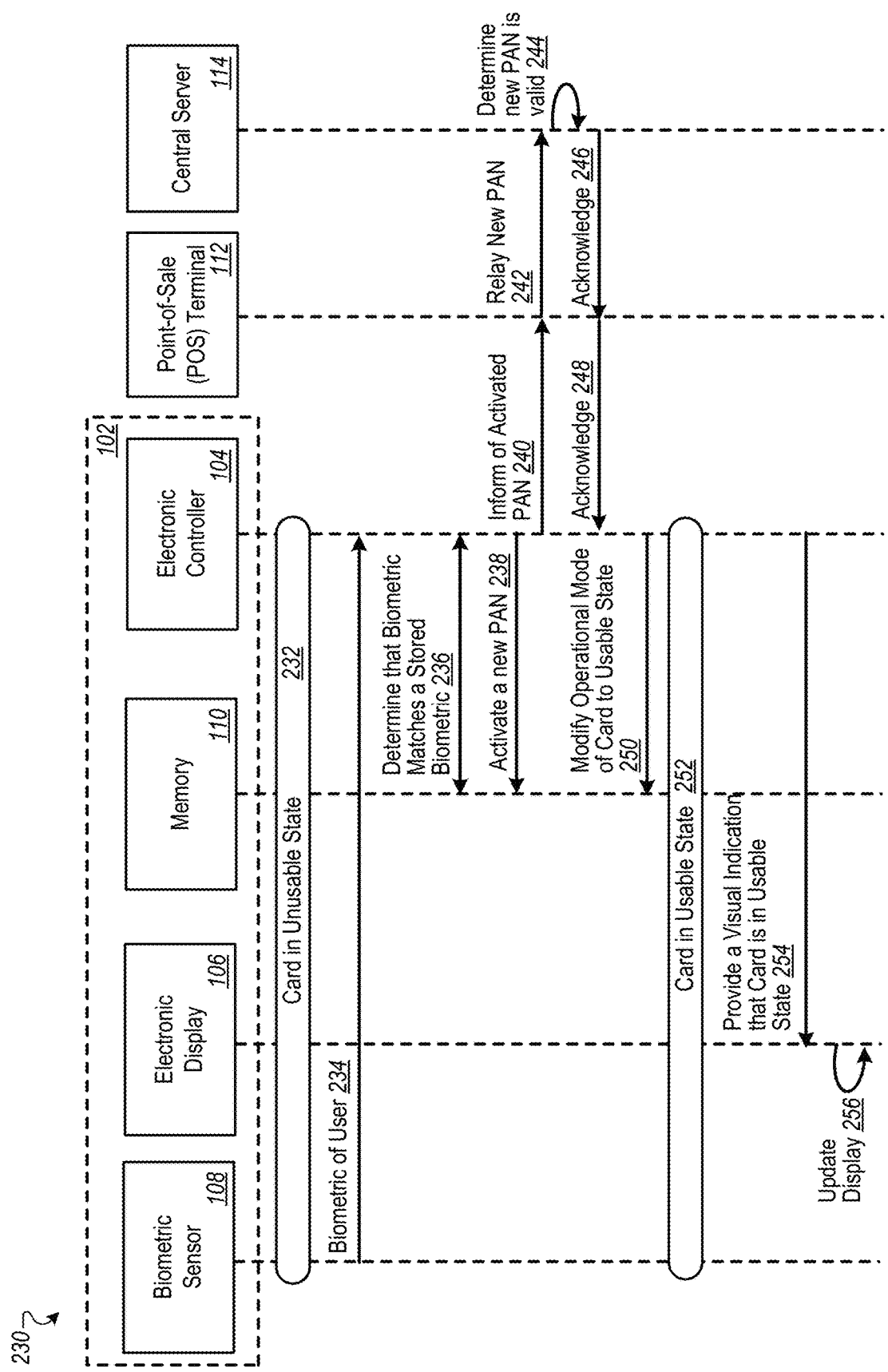
FIG. 2B is a swim lane diagram showing an example method for unlocking a card.

FIG. 2B is a swim lane diagram showing an example method 230 for unlocking a card. For clarity of presentation, the description that follows generally describes method 230 in the context of FIG. 1. However, it will be understood that the method 230 may be performed, for example, by any other suitable system, environment, software, and hardware, or a combination of systems, environments, software, and hardware as appropriate. For example, the card 102 and/or its components, particularly the electronic controller 104, can be used to execute the method 230.

At a time that the method 230 is applicable, the card 102 is in an unusable state 232. For example, the time can be a time after which the card has been put in an unusable state, such as the alert state, through the steps of the method 200 described above with reference to FIG. 2A. At this time, the visible display element 103b may be displaying an indication (e.g., a color indicative of the alert state (e.g., red), text or an image, or some other visible indicator), indicating that the card 102 is unusable. The card 102 may also be in an unusable state when initially received, such as by mail, and before activation by a user, such as by calling an 800 activation number or activating the card 102 online. At such time, the user may activate the card prior to a first use, such as at a POS terminal.

At 234, the electronic controller 104 embedded in the card 102 that has an operational mode of an unusable state can receive a biometric input (e.g., a thumb print) from the biometric sensor 108. The biometric input can be a biometric data point, identifier, or value for or associated with a user to which the card is issued by an entity, such as by the central server 114. At this time, the unusable state of the card can have been previously identified by the entity for a particular PAN assigned to the card 102. The unusable state of the card can indicate that particular PAN is invalidated for use in further data exchanges using the card 102.

At 236, the electronic controller 104 can determine that the received biometric input matches one of one or more stored biometric values of users authorized to use the card, such as the biometric values or profiles 120 stored in memory 110, such as stored as biometric profiles, data sets, or in other ways.

At 238, the electronic controller 104 can activate, based on determining a match of the received biometric input, a new PAN for the card. The new PAN can be usable in further data exchanges of the card. The new PAN activated for the card 102 can be one of the one or more PANs stored to the card 102, such as in the pre-loaded PANs 118. The activated new PAN can be, for example, a next PAN in a set of pre-loaded PANs on the card, or a randomly-assigned PAN assigned from the set of pre-loaded PANs or from PANs generated for the card in sync with the card-issuing host.

At 240, the electronic controller 104 can, for example, inform the POS terminal 112 that the card has been reactivated. The information can include the new PAN (and potentially other information), and the POS terminal 112 can forward the information to the central server 114 or the appropriate payment/payment network such as Visa or MasterCard. At 242, the new PAN can be relayed to the central server 114.

At 244, the central server 114 can associate the user account with the received new PAN, including confirming that the new PAN as valid from a list of PANs associated with the card. In some implementations, confirming that the new PAN is valid can occur in combination with allowance of a new transaction that uses the new PAN. In some implementations, confirming that the new PAN is valid can be separate from any new transaction that uses the new PAN. In some implementations, confirmation of a new PAN on the card can occur wirelessly. For example, a password can be input into the mobile device, where the password is generated from the card and displayed on the visual display of the card (or alternatively, in a user interface of the mobile device). Entering the password can initiate the new PAN and confirm that the user has received the new PAN.

At 246, the central server 114 can acknowledge that the new PAN is activated. At 248, the POS terminal 112 can relay the acknowledgement to the card 102.

At 250, the electronic controller 104 can modify the operational mode of the card to a usable state. For example, the electronic controller 104 set the card state 116 to a usable state.

At 252, the card 102 is in a usable state, meaning that the card 102 is now again usable for transactions, including, for example, indicating that the newly-assigned PAN is valid for further data exchanges. In some implementations, the usable state can be represented in the card 102 by storage of the current card state 116.

At 254, the electronic controller 104 can provide information to the electronic display 106 that the card is usable. For example, the information can be a flag that is used by the electronic display to look up a color for updating the display. In another example, the information can include a code that looks up a coded message that has placeholders for filling in other information, such as the PAN, account-related information, or user-related information.

At 256, the electronic display 106 can update the visible display element 103b, such as turning the color of the display to green (e.g., replacing red).

Figure 3A:
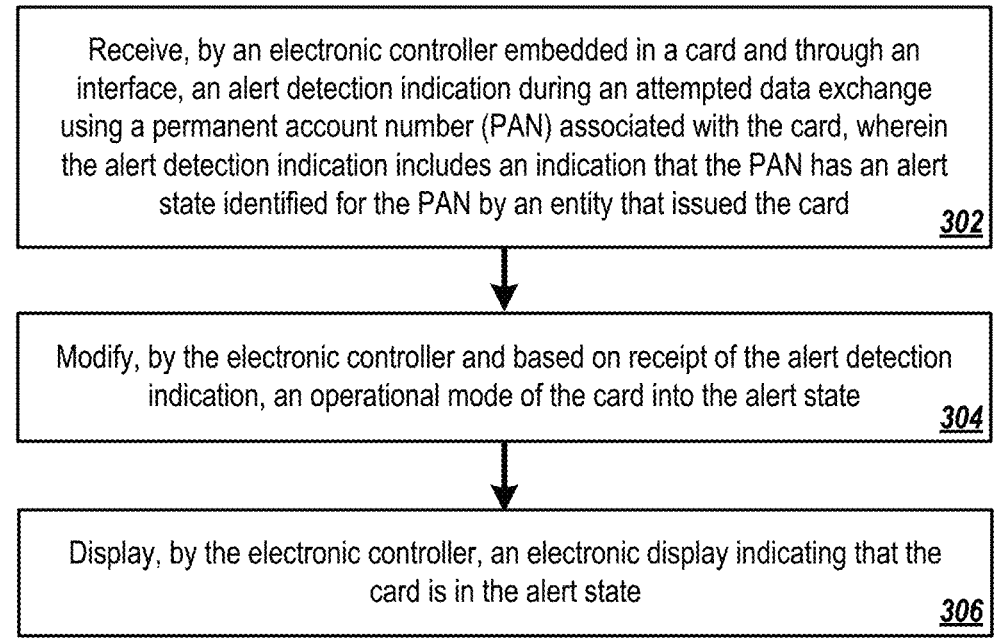
FIG. 3A is a flowchart of an example method for placing a card into an alert state.

FIG. 3A is a flowchart of an example method 300 for placing a card into an alert state. For clarity of presentation, the description that follows generally describes method 300 in the context of FIGS. 1-2B. However, it will be understood that the method 300 may be performed, for example, by any other suitable system, environment, software, and hardware, or a combination of systems, environments, software, and hardware as appropriate. For example, the card 102 and/or its components can be used to execute the method 300.

At 302, an alert detection indication is received during an attempted data exchange using a PAN associated with a card. The alert detection indication is received by an electronic controller embedded in the card and is received through an interface. The alert detection indication indicates that the PAN has an alert state identified for the PAN by an entity that issued the card. For example, the card 102 can receive an alert detection indication from the POS terminal 112, as described above with reference to steps 202-210 of FIG. 2A.

At 304, an operational mode of the card is modified into the alert state by the electronic controller and is based on receipt of the alert detection indication. As an example, the electronic controller 104 can place the card 102 into an alert state, as described above with reference to steps 212-214 of FIG. 2A.

At 306, an electronic display indicating that the card is in the alert state is displayed by the electronic controller. For example, the electronic display 106 can update the visible display element 103b, such as by turning the color of the display to red (e.g., replacing green).

Figure 3B:
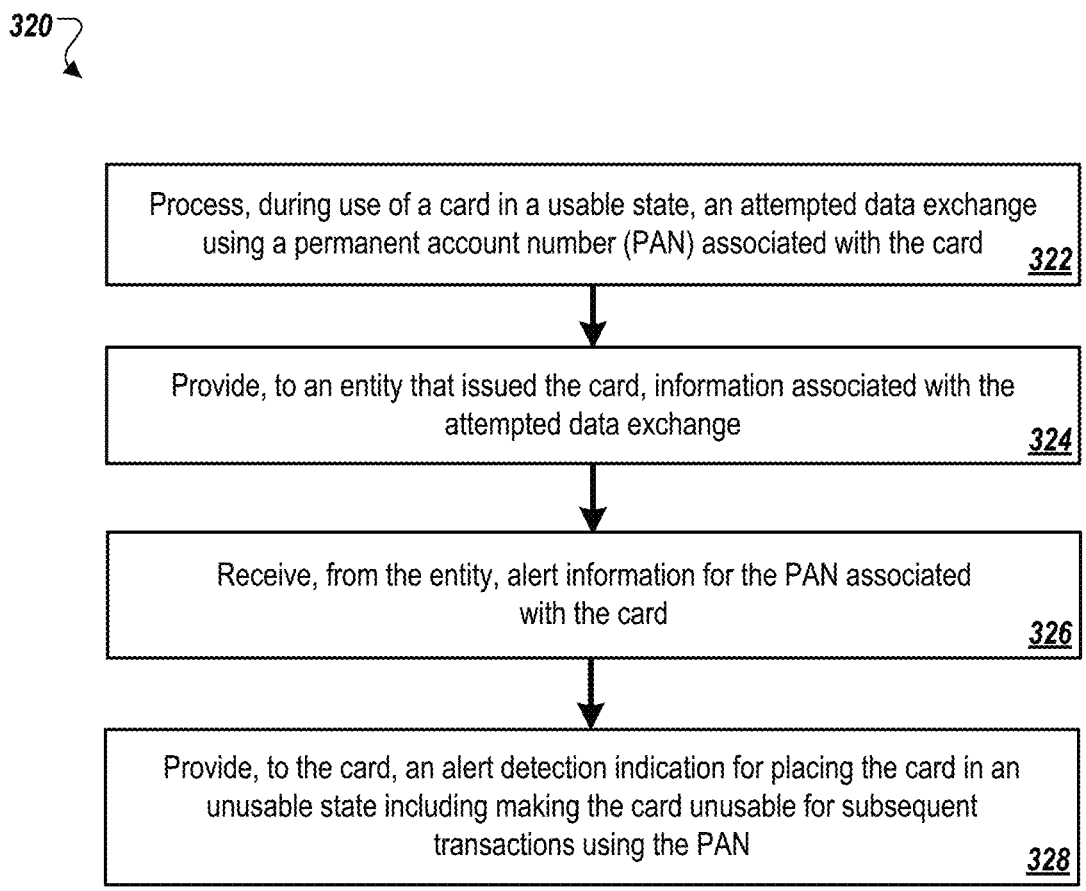
FIG. 3B is a flowchart of an example method for placing a card into an alert state, from the perspective of a POS.

FIG. 3B is a flowchart of an example method 320 for placing a card into an alert state, from the perspective of a POS. For clarity of presentation, the description that follows generally describes method 320 in the context of FIGS. 1-2B. However, it will be understood that the method 320 may be performed, for example, by any other suitable system, environment, software, and hardware, or a combination of systems, environments, software, and hardware as appropriate. For example, the card 102 and/or its components can be used to execute the method 320.

At 322, during use of a card in a usable state, an attempted data exchange using a PAN associated with the card is processed. For example, the POS terminal 112 can receive (e.g., at 204 in FIG. 2A) an attempted data exchange (e.g., a monetary transaction) that uses a particular PAN associated with the card 102.

At 324, information associated with the attempted data exchange is provided to an entity that issued the card. For example, at 206 of FIG. 2A, the POS terminal 112 can provide transaction information associated with the attempted data exchange to the central server 114.

At 326, alert information for the PAN associated with the card is received from the entity. For example, at 208 of FIG. 2A, the POS terminal 112 can receive the alert from the central server 114.

At 328, an alert detection indication is provided to the card for placing the card in an unusable state including making the card unusable for subsequent transactions using the PAN. For example, at 210 of FIG. 2A, the POS terminal 112 can provide the alert detection indication to the card 102.

Figure 3C:
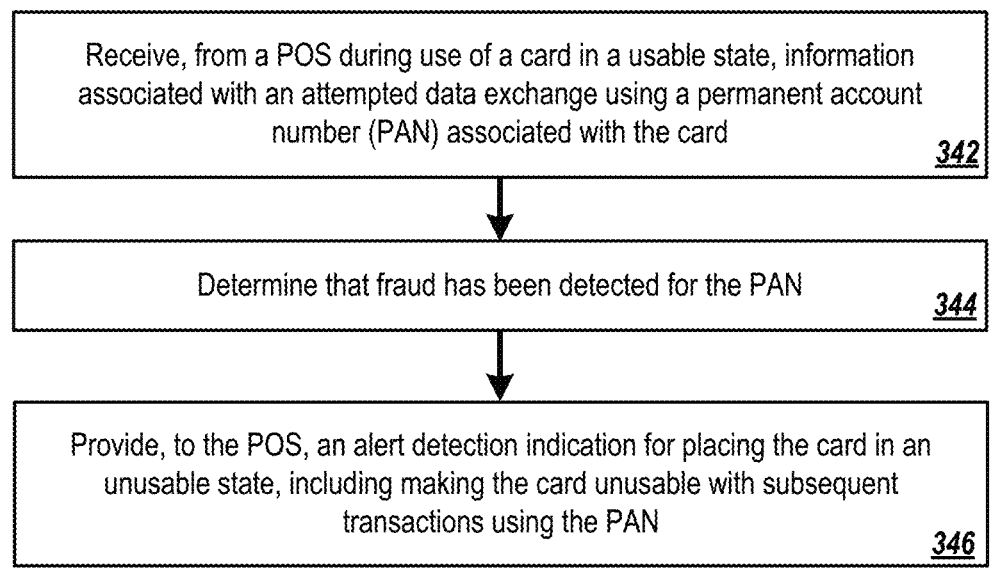
FIG. 3C is a flowchart of an example method for placing a card into an alert state, from the perspective of an entity.

FIG. 3C is a flowchart of an example method 340 for placing a card into an alert state, from the perspective of an entity. For clarity of presentation, the description that follows generally describes method 340 in the context of FIGS. 1-2B. However, it will be understood that the method 340 may be performed, for example, by any other suitable system, environment, software, and hardware, or a combination of systems, environments, software, and hardware as appropriate. For example, the card 102 and/or its components can be used to execute the method 340.

At 342, information associated with an attempted data exchange using a PAN associated with the card is received from a POS during use of a card in a usable state. For example, at 206 of FIG. 2A, the central server 114 can receive, from the POS terminal 112, transaction information associated with the attempted data exchange.

At 344, a determination is made that fraud has been detected for the PAN. For example, at 207 of FIG. 2A, the central server 114 can use the received PAN to determine that the PAN has been compromised, such as based on detected or reported fraudulent activity or for some other reason.

At 346, an alert detection indication is provided to the POS for placing the card in an unusable state, including making the card unusable with subsequent transactions using the PAN. For example, at 208 of FIG. 2A, the central server 114 can provide the alert to the POS terminal 112. The POS terminal 112 can then provide the indication to the card 102.

Figure 4A:
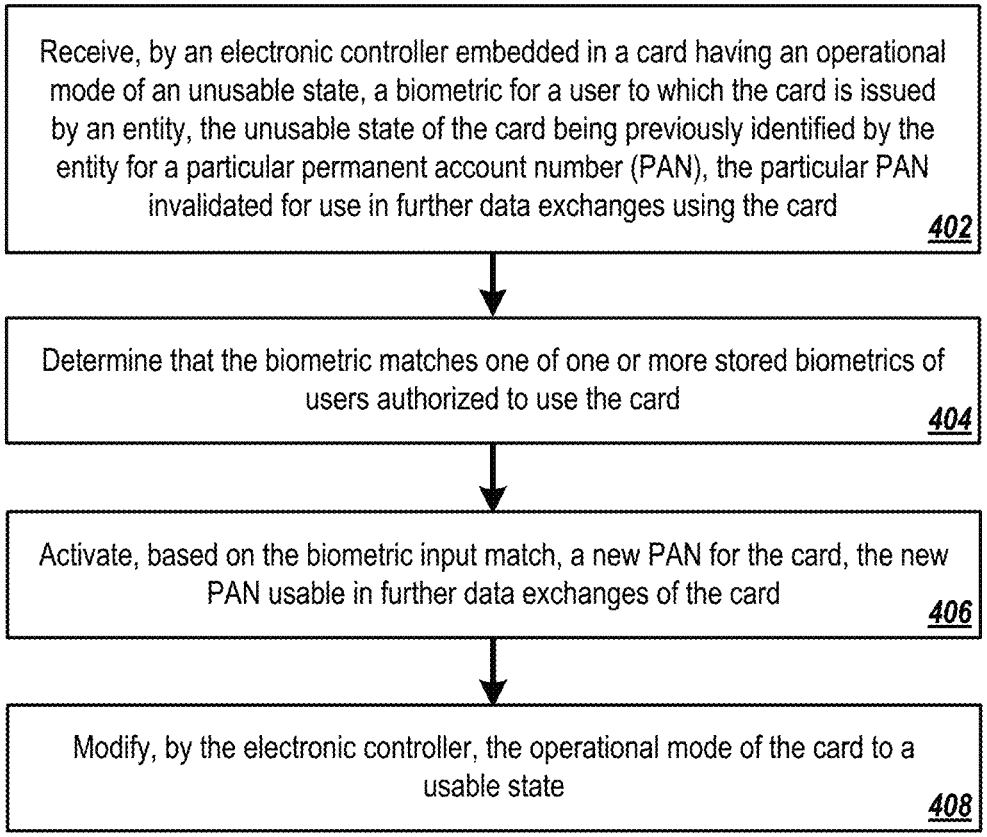
FIG. 4A is a flowchart of an example method for placing a card into a usable state.

FIG. 4A is a flowchart of an example method 400 for placing a card into a usable state. For clarity of presentation, the description that follows generally describes method 400 in the context of FIGS. 1-2B. However, it will be understood that the method 400 may be performed, for example, by any other suitable system, environment, software, and hardware, or a combination of systems, environments, software, and hardware as appropriate. For example, the card 102 and/or its components can be used to execute the method 400.

At 402, a biometric input is received for a user to which a card has been issued by an entity. For example, at the time that the biometric input is received, the card can have an operational mode of an unusable state that has been previously identified by the entity (e.g., the central server 114) for a particular PAN. The particular PAN is invalidated for use in further data exchanges using the card 102. The biometric input can be received, for example, by an electronic controller embedded in the card 102, as described with reference to step 234 of FIG. 2B.

At 404, a determination is made that the biometric input matches one of one or more stored biometric values of or associated with users authorized to use the card. As an example, the electronic controller 104 can determine that the received biometric input matches at least one of the stored biometric values of users who are authorized to use the card 102. Determining a match, for example, can be based on using information in the biometric values or profiles 120 stored in memory 110.

At 406, based on the biometric input match, a new PAN is activated for the card. The new PAN is usable in further data exchanges of the card. For example, as described with reference to step 238 of FIG. 2B, based on determining a match of the received biometric input, the electronic controller 104 can activate a new PAN for the card. The new PAN can be usable in further data exchanges of the card. The new PAN activated for the card 102 can be one of the one or more PANs stored to the card 102, such as in the pre-loaded PANs 118. The activated new PAN can be, for example, a next PAN in a set of pre-loaded PANs on the card, or a randomly-assigned PAN assigned from the set of pre-loaded PANs.

At 408, the operational mode of the card is modified to a usable state by the electronic controller. For example, as described with reference to step 250 of FIG. 2B, the electronic controller 104 set the card state 116 to a usable state.

In some implementations, the method 400 can further include displaying, by the electronic controller, a first electronic display on the card, the first electronic display indicating that the card is in a usable state. For example, the electronic display 106 can cause the visible display element 103b to display a color (e.g., green) that indicates that the card 102 is now active.

Figure 4B:
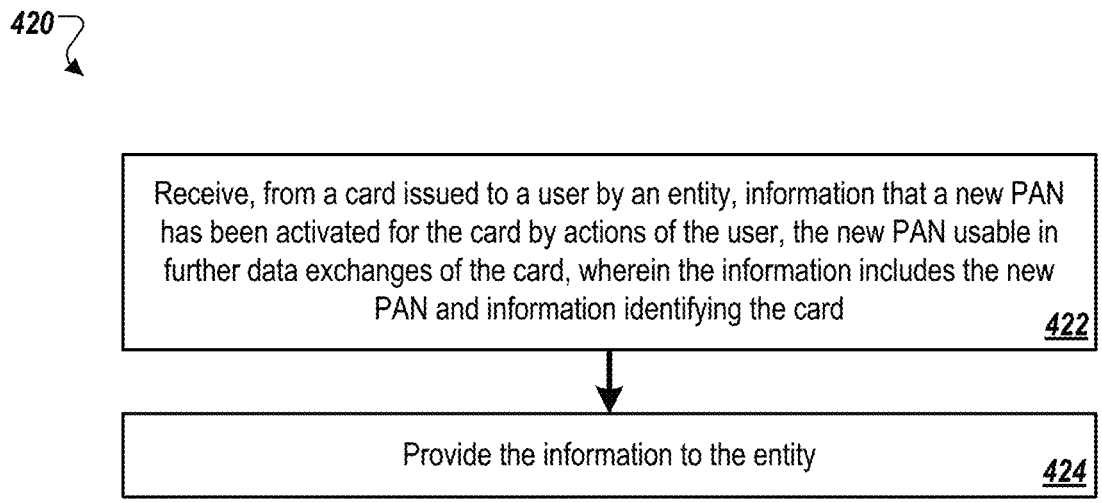
FIG. 4B is a flowchart of an example method for placing a card into a usable state, from the perspective of a POS.

FIG. 4B is a flowchart of an example method 420 for placing a card into a usable state, from the perspective of a POS. For clarity of presentation, the description that follows generally describes method 420 in the context of FIGS. 1-2B. However, it will be understood that the method 420 may be performed, for example, by any other suitable system, environment, software, and hardware, or a combination of systems, environments, software, and hardware as appropriate. For example, the card 102 and/or its components can be used to execute the method 420.

At 422, information is received from a card issued to a user by an entity that a new PAN has been activated for the card by actions of the user. The new PAN is usable in further data exchanges of the card, and the information includes the new PAN and information identifying the card. For example, at 240 of FIG. 2B, the electronic controller 104 can inform the POS terminal 112 that the card has been reactivated. The information can include the new PAN (and potentially other information).

At 424, the information is provided to the entity. As an example, at 242 of FIG. 2B, the POS terminal 112 can relay the information to the central server 114. In some implementations, the POS terminal 112 can receive an acknowledgement (e.g., at 406 of FIG. 2B) from the central server 114 and forward the acknowledgement (e.g., at 408 of FIG. 2B) to the electronic controller 104.

FIG. 4C is a flowchart of an example method 440 for placing a card into a usable state, from the perspective of an entity. For clarity of presentation, the description that follows generally describes method 440 in the context of FIGS. 1-2B. However, it will be understood that the method 440 may be performed, for example, by any other suitable system, environment, software, and hardware, or a combination of systems, environments, software, and hardware as appropriate. For example, the card 102 and/or its components can be used to execute the method 440.

At 442, information is received from a POS being used by a user that a new PAN has been activated for a card issued to the user by the entity. The new PAN is usable in further data exchanges of the card, and the information includes the new PAN and information identifying the card. As an example, at 242 of FIG. 2B, the POS terminal 112 can relay the information to the central server 114.

At 444, a determination is made that the new PAN is valid. As an example, at 244, of FIG. 2B, the central server 114 can confirm that the new PAN as valid from a list of PANs associated with the card 102.

At 446, the information is stored at a server of the entity. For example, the central server 114 can store information at a server of the central server 114 and/or at other locations. The information can indicate, for example, that the new PAN is authorized for transactions using the card 102. In some implementations, the central server 114 can provide an acknowledgement (e.g., at 406 of FIG. 2B) to the POS terminal 112.

Figure 5:
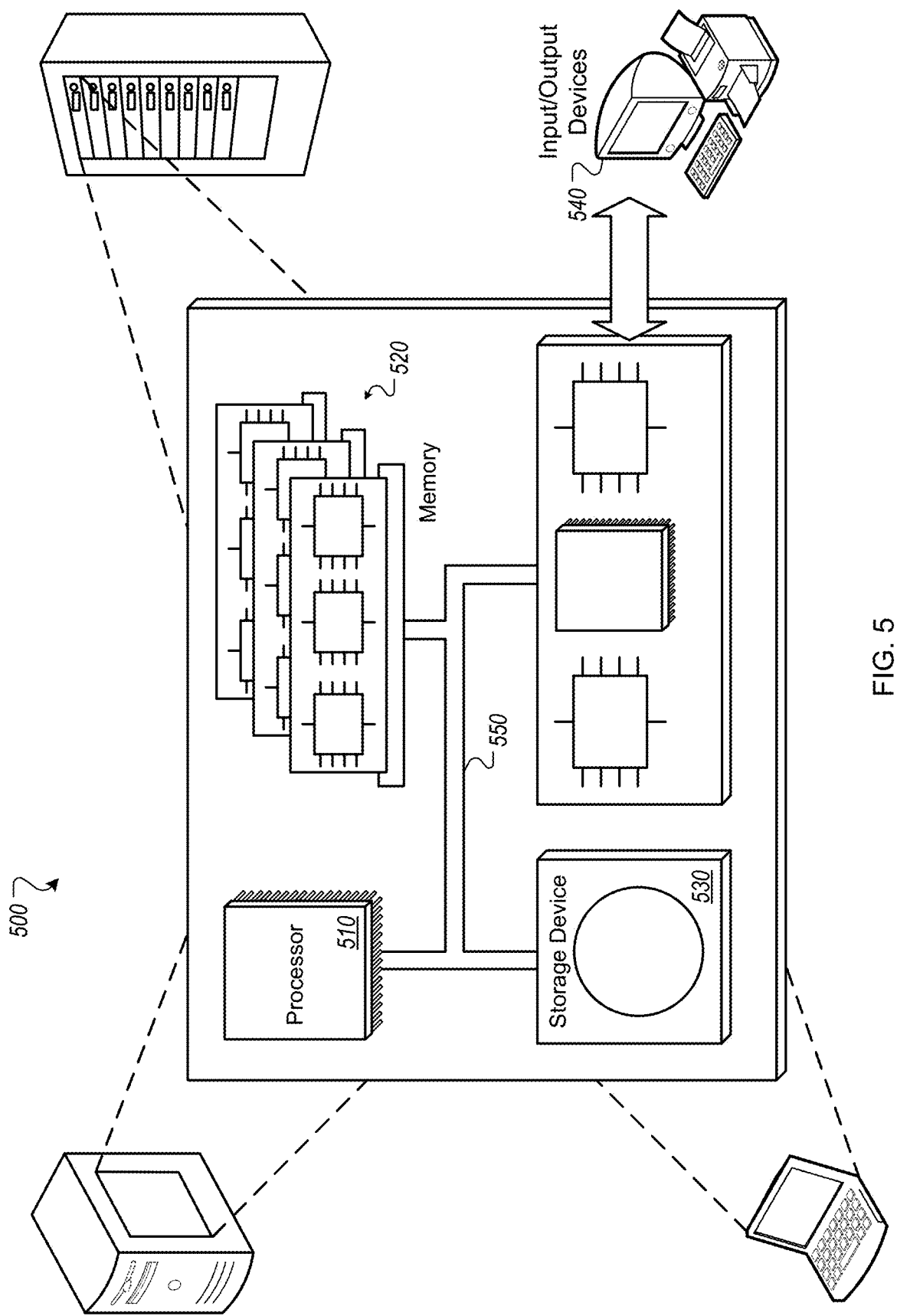
FIG. 5 is a schematic diagram of an example of a computer system.

FIG. 5 is a schematic diagram of an example of a computer system 500. The computer system 500 can be used for the operations described in association with methods and flows described above, according to at least some implementations.

The computer system 500 includes a processor 510, a memory 520, a storage device 530, and an input/output device 540. Each of the components 510, 520, 530, and 540 are interconnected using a system bus 550. The processor 510 is capable of processing instructions for execution within the computer system 500. In some implementations, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the computer system 500. In some implementations, the memory 520 is a non-transitory computer-readable medium. In some implementations, the memory 520 is a volatile memory unit. In another implementation, the memory 520 is a non-volatile memory unit.

The storage device 530 is capable of providing mass storage for the computer system 500. In some implementations, the storage device 530 is a non-transitory computer-readable medium. In various different implementations, the storage device 530 may be a floppy disk device, a hard disk device, an optical disk device, or a tape device.

The input/output device 540 provides input/output operations for the computer system 500. In some implementations, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a Web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components.

Specifically, each processor can execute the functionality required to send requests and/or data to components of the environment and to receive data from the components of the environment, such as in communications between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a Web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. An electronic card comprising:
   a biometric sensor operable to read a biometric input of a cardholder of the electronic card, the biometric input associated with an attempted authentication by the cardholder, as an authorized user of the electronic card, wherein one or more authorized users are defined by an entity associated with the electronic card;
   an electronic controller embedded in the electronic card and coupled to the biometric sensor, the electronic controller operable to:
      receive, from the biometric sensor and via the electronic controller embedded in the electronic card at a time when the electronic card has an operational mode of an unusable state, biometric input of the cardholder, the unusable state of the electronic card being previously identified by the entity for a particular permanent account number (PAN) of an account based on a fraud state associated with the particular PAN, wherein when the electronic card is in the unusable state the electronic card is unusable for further data exchanges and the particular PAN is invalidated for use in further transactions using the electronic card;
      determine that the received biometric input matches a pre-loaded biometric profile stored on the electronic card, the pre-loaded biometric profile associated with a particular one of the one or more authorized users of the electronic card;
      select, in response to determining that the received biometric input matches the pre-loaded biometric profile, a next active PAN for the account and the electronic card different than the particular PAN, after the particular PAN is invalidated, from among two or more unactivated PANs pre-loaded on the card;
      activate the next active PAN for the account without issuing a new electronic card, wherein the next active PAN is usable in further transactions of the electronic card; and
      modify, in response to determining that the received biometric input matches the pre-loaded biometric profile, the operational mode of the electronic card to a usable state in which the electronic card is again usable for further data exchanges; and
   memory storing:
      the two or more unactivated PANs pre-loaded on and assigned to the electronic card; and
      one or more biometric profiles of at least a subset of the one or more authorized users authorized to use the electronic card; and
   one or more processors performing operations, using the memory, the operations including operations of the electronic controller.

2. The electronic card of claim 1, wherein the biometric input consists of at least one of a finger print, a palm print, a voice print, an image of a face, an iris scan, a retinal scan, and a body scent.

3. The electronic card of claim 1, further comprising a first electronic display embedded in the electronic card and coupled to the electronic controller, the first electronic display operable to:
   receive, from the electronic controller, information that the electronic card is in the usable state; and provide a visual indication that the electronic card is in the usable state.

4. The electronic card of claim 3, further comprising a second electronic display operable to present the next active PAN.

5. The electronic card of claim 4, wherein the second electronic display and the first electronic display comprise a single display.

6. The electronic card of claim 4, wherein the second electronic display is separate from the first electronic display.

7. The electronic card of claim 6, wherein the second electronic display is a liquid crystal display (LCD) display area, and wherein the first electronic display is a light emitting diode (LED) indicator.

8. The electronic card of claim 3, further comprising a chip embedded in the electronic card and operable to be read by chip readers, the chip coupled with the biometric sensor, the electronic controller, and the first electronic display.

9. The electronic card of claim 3, wherein the first electronic display includes a light-emitting diode (LED), and wherein the LED displays a fraud indication color for an alert state of the electronic card that is different from a color displayed for a usable state of the electronic card.

10. The electronic card of claim 1, wherein the next active PAN activated for the electronic card is one of the one or more unactivated PANs stored to the electronic card.

11. The electronic card of claim 1, wherein the next active PAN activated for the electronic card is one of:
a next PAN in a set of pre-loaded PANs on the electronic card; or
a randomly-assigned PAN assigned from the set of pre-loaded PANs,
wherein the pre-loaded PANs on the electronic card correspond to a set of valid PANs stored at the entity.

12. The electronic card of claim 1, wherein the further data exchanges include monetary transactions.

13. The electronic card of claim 1, wherein the electronic card consists of at least one of a credit card, a debit card, a value-added card, a point-of-entry card, or an identification card.

14. The electronic card of claim 1, wherein the electronic controller is operable to:
send the next active PAN to a point of sale (POS) terminal, wherein the POS terminal forwards the next active PAN to a central server associated with the entity; and
receive, from the POS terminal, an acknowledgement that the central server has validated the next active PAN and associated the next active PAN with the account;
wherein the electronic controller modifies the operational mode of the electronic card to the usable state based on receiving the acknowledgement and determining that the received biometric input matches the pre-loaded biometric profile.

15. A method comprising:
receiving, from a biometric sensor coupled to an electronic controller embedded in a card at a time when the card has an operational mode of an unusable state, a biometric input of a user to which the card is issued by an entity, the unusable state of the card being previously identified by the entity for a particular permanent account number (PAN) of an account based on a fraud state associated with the particular PAN, wherein when the card is in the unusable state the card is unusable for further data exchanges and the particular PAN is invalidated for use in further transactions using the card, wherein the biometric input is associated with an attempted authentication by the user as an authorized user of the card, wherein one or more authorized users are defined by an entity associated with the card;
determining that the received biometric input matches a pre-loaded biometric profile stored on the card, the pre-loaded biometric profile associated with a particular one of the one or more authorized users of the card;
selecting, in response to determining that the received biometric input matches the pre-loaded biometric profile, a next active PAN for the account and the card different than the particular PAN, after the particular PAN is invalidated, from among two or more unactivated PANs pre-loaded on the card;
activating the next active PAN for the account without issuing a new card, wherein the next active PAN is usable in further transactions of the card; and
modifying, in response to determining that the received biometric input matches the pre-loaded biometric profile, by the electronic controller, the operational mode of the card to a usable state in which the card is again usable for further data exchanges.

16. The method of claim 15, further comprising displaying, on a first electronic display of the card, an indication that the card is in the usable state.

17. The method of claim 16, further comprising displaying, on a second electronic display of the card, the next active PAN.

18. The method of claim 15, wherein the next active PAN activated for the card is one of one or more PANs stored to the card.

19. The method of claim 15, wherein the next active PAN activated for the card is one of:
a next PAN in a set of pre-loaded PANs on the card; or
a randomly-assigned PAN assigned from the set of pre-loaded PANs,
wherein the pre-loaded PANs on the card correspond to a set of valid PANs stored at the entity.

20. The method of claim 15, wherein the card consists of at least one of a credit card, a debit card, a value-added card, a point-of-entry card, or an identification card.

21. The method of claim 15, wherein the biometric input consists of at least one of a finger print, a palm print, a voice print, an image of a face, an iris scan, a retinal scan, and a body scent.

22. A computer-readable media, the computer-readable media comprising computer-readable instructions embodied on tangible, non-transitory media, the instructions operable when executed by at least one processor to perform operations comprising:
receiving, from a biometric sensor coupled to the at least one processor embedded in a card at a time when the card has an operational mode of an unusable state, a biometric input of a user to which the card is issued by an entity, the unusable state of the card being previously identified by the entity for a particular permanent account number (PAN) of an account based on a fraud state associated with the particular PAN, wherein when the card is in the unusable state the card is unusable for further data exchanges and the particular PAN is invalidated for use in further transactions using the card, wherein the biometric input is associated with an attempted authentication by the user as an authorized user of the card, wherein one or more authorized users are defined by an entity associated with the card;
determining that the received biometric input matches a pre-loaded biometric profile stored on the card, the pre-loaded biometric profile associated with a particular one of the one or more authorized users of the card;

selecting, in response to determining that the received biometric input matches a pre-loaded biometric profile, a next active PAN for the account and the card different than the particular PAN, after the particular PAN is invalidated, from among two or more unactivated PANs pre-loaded on the card, wherein selecting the next active PAN comprises selecting a next PAN in the unactivated PANs pre-loaded on the card or selecting a randomly-assigned PAN assigned from the unactivated PANs pre-loaded, wherein the unactivated PANs pre-loaded on the card correspond to a set of valid PANs stored at the entity;

activating the next active PAN for the account without issuing a new card, wherein the next active PAN is usable in further transactions of the card; and modifying, in response to determining that the received biometric input matches the pre-loaded biometric profile, by the at least one processor, the operational mode of the card to a usable state in which the card is again usable for further data exchanges.

23. The computer-readable media of claim 22, wherein the operations further comprise displaying, on a first electronic display of the card, an indication that the card is in the usable state.

24. The computer-readable media of claim 23, wherein the operations further comprise displaying, on a second electronic display of the card, the next active PAN.

25. The computer-readable media of claim 22, wherein the next active PAN activated for the card is one of one or more PANs stored to the card.

26. The computer-readable media of claim 22, wherein the card consists of at least one of a credit card, a debit card, a value-added card, a point-of-entry card, or an identification card.

27. The computer-readable media of claim 22, wherein the biometric input consists of at least one of a finger print, a palm print, a voice print, an image of a face, an iris scan, a retinal scan, and a body scent.

* * * * *